(No Model.)
S. SLAUGHTER.
TIRE TIGHTENER.
No. 600,624. Patented Mar. 15, 1898.
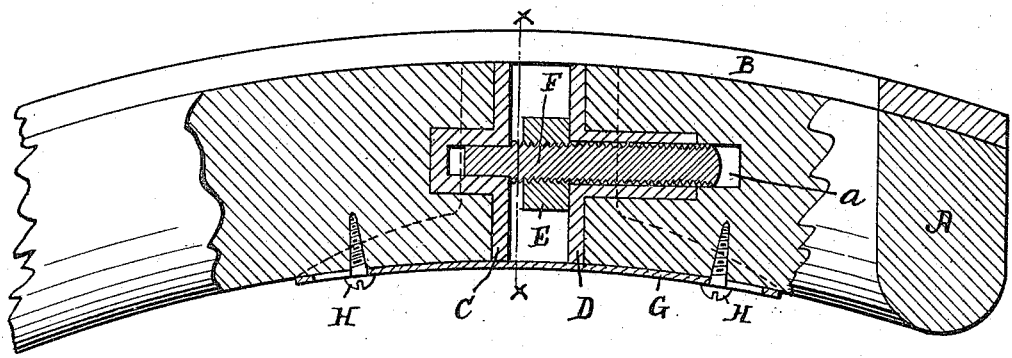
Fig. 1.
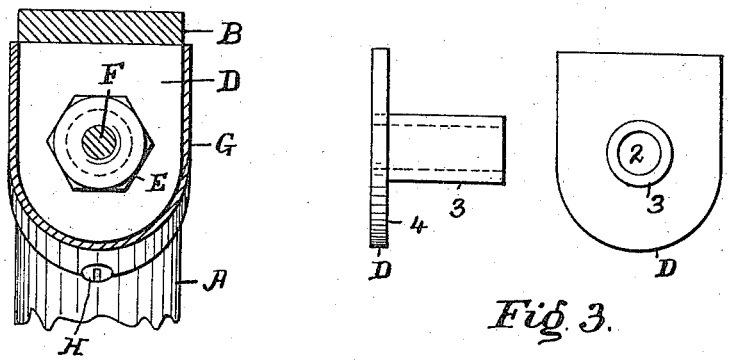
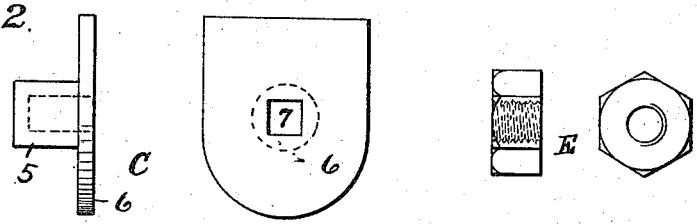
Witnesses.
Chas. Marien
D. D. Deane
Inventor:
Sherman Slaughter
By Jno. S. Thurman
Attorney

UNITED STATES PATENT OFFICE.

SHERMAN SLAUGHTER, OF CLARK'S HILL, INDIANA, ASSIGNOR TO FRANCIS M. STINGLEY AND JEFFERSON J. YOUNG, OF SAME PLACE.

TIRE-TIGHTENER.

SPECIFICATION forming part of Letters Patent No. 600,624, dated March 15, 1898.

Application filed October 4, 1897. Serial No. 654,097. (No model.)

*To all whom it may concern:*

Be it known that I, SHERMAN SLAUGHTER, a citizen of the United States, residing at Clark's Hill, in the county of Tippecanoe and State of Indiana, have invented certain new and useful Improvements in Tire-Tighteners; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to that class of vehicle-wheels having a wooden rim or felly and a metallic tire; and it consists in a novel and simple device which is inserted in the joints of the rim, by which the latter is expanded when it becomes loose in the tire, my invention being particularly adapted to be applied to old wheels without requiring special tools, and being of simple and cheap construction may as well be applied to new wheels without adding materially to the cost, thus being at hand when required as the rims shrinks and requires expanding in order to prevent the tire from becoming loose.

Tire-tighteners of this class as heretofore made require a neat and exact dressing of the ends of the felly parts at the joints in order to insert them, while my invention may be applied by the use of such simple tools as a boring-bit and saw, which are usually at hand in a barn.

Referring to the drawings, Figure 1 represents a side view of a portion of a wheel-rim and tire in which the joint is shown in a fragmentary vertical sectional view exposing my tightener as applied thereto; Fig. 2, a transverse sectional view on the line X X of Fig. 1; Fig. 3, detail views of the screw-guide; Fig. 4, detail views of the screw-head socket; Fig. 5, a side and an end view of the screw, and Fig. 6 a detail view of the expanding-nut.

In the drawings, A designates the felly; B, the tire; C, the screw-head socket; D, the screw-guide; E, the expanding-nut; F, the screw, and G the joint-cap.

The screw-head socket C consists of a casting, preferably of malleable iron, and comprises the projection 5, having a recess 7 at the front adapted to receive the head of the screw and to prevent its rotation, the screw-head being preferably rectangular and the flange 6 of the same contour as the felly is in cross-section.

The screw-guide D comprises the thimble 3 and the flange 4, the latter being a counterpart of the flange 6 of the socket C. The thimble 3 is adapted to receive loosely the screw and guide it laterally in the cylindrical bore 2.

The screw F has screw-threads from one end to nearly the head and is provided under the head with a collar 9, which, with the head 8, is made integrally, the latter being adapted to fit into the recess 7.

The expanding-nut E is of the usual form, threaded and adapted to fit over the threaded portion of the screw F.

The joint-cap G is made in the usual way and is of the common type, but adapted to cover the joint-opening entirely, and is secured to the felly by means of screws H or by the tire-bolts, as desired.

In applying my device the end of one piece of felly at the joint is sprung aside and a small hole bored in the end, adapted to receive the projection 5, and a hole is bored into the end of the opposite piece, adapted to receive the thimble 3. Both castings are then driven in and the screw having the nut run up to the collar is inserted and the felly alined, after which the nut is turned so that it presses against the face of the screw-guide, while the collar of the screw presses against the face of the head-socket casting, and thus the rim is expanded to any desired degree.

It will be seen that the only point at which the inevitable corrosion can take place injuriously is between the nut and screw, which is easily accessible when it is necessary to apply oil to it in order to turn it, and which advantage is not possessed in other forms. A further advantage is that the nut being of small size and trifling expense as to the whole I usually make it of bronze to prevent corrosion.

Having thus described my invention, what I claim, and desire to secure by Letters Patent, is—

In a tire-tightener, the combination of the screw-head socket C having the projection 5 inserted into a bore in the end of the felly, and having the flange 6 bearing against the end of the felly; the screw-guide D having the thimble 3 inserted into a bore in the end of the opposite felly, and having the flange 4 bearing against the end of the felly; the screw F having threads and the nut working thereon and bearing against said flange 4, and having the collar and rectangular head 8, said head being inserted in said socket to prevent its rotating and the opposite end of said screw being inserted in said thimble to guide it laterally, and the joint-cap, substantially as shown and described.

In testimony whereof I affix my signature in presence of two witnesses.

SHERMAN SLAUGHTER.

Witnesses:
 JNO. S. THURMAN,
 D. D. DEANE.